Feb. 22, 1927. 1,618,817
W. DOOLEY
SHEARS
Filed June 18, 1926 2 Sheets-Sheet 1

INVENTOR
William Dooley
by his attys.
Byrnes, Stebbins & Parmelee

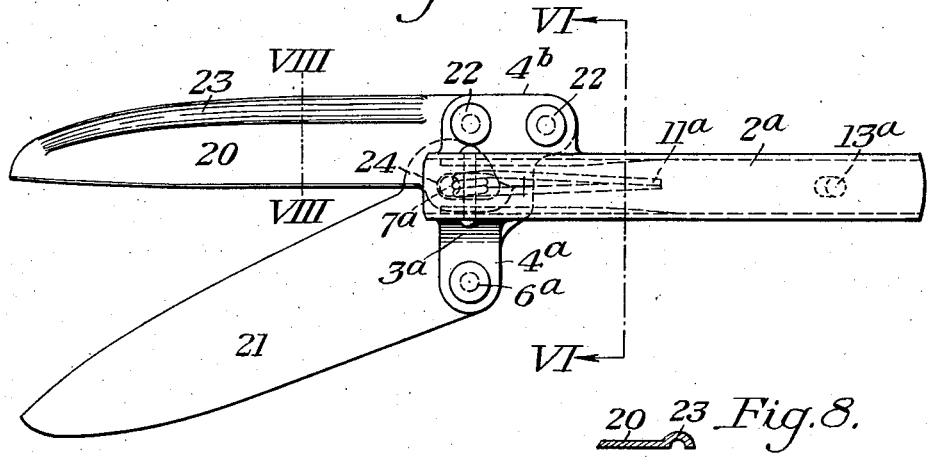
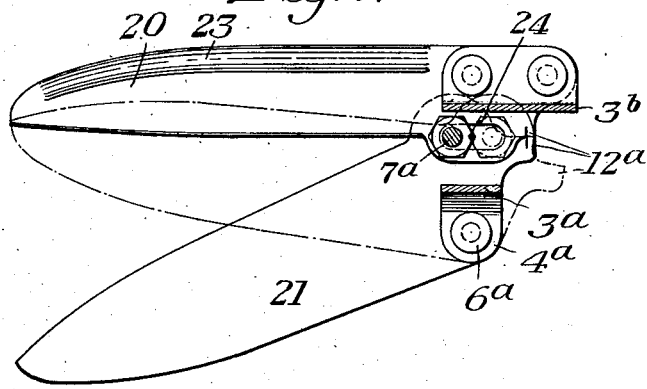
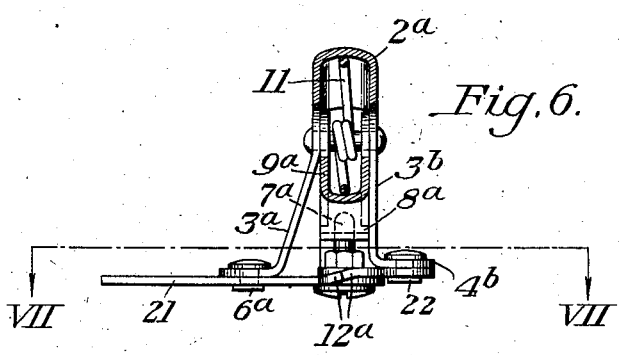

Patented Feb. 22, 1927.

1,618,817

UNITED STATES PATENT OFFICE.

WILLIAM DOOLEY, OF ALLIANCE, OHIO, ASSIGNOR TO THE ALLIANCE TOY & SPECIALTY COMPANY, OF ALLIANCE, OHIO, A CORPORATION OF OHIO.

SHEARS.

Application filed June 18, 1926. Serial No. 116,876.

This invention relates to shears, and more particularly to a hand shear for trimming grass and the like.

I preferably employ a hand shear wherein the handles are in a plane substantially perpendicular to the plane of the blades. This arrangement makes the shear much easier to work, as set out for example in the patent to Goodwin 1,354,968. I provide a support or handle for the blades and arrange at least one of the blades on this support for pivotal movement. The blades are preferably interconnected and arranged to permit of some movement of the pivot when the blade is actuated. It is found that if the moving blade is supported merely at the pivot point, it has a tendency to wobble and become unsatisfactory under severe service and some means other than the pivot for supporting the blade is desirable. This may be accomplished by pivotally connecting the two blades and arranging for movement of both of them, or else one of the blades may be fixed and a sliding connection arranged between them. In either case it is desirable to provide a movable pivot point as herein disclosed, for with this arrangement the structure is materially simplified.

Figure 1:
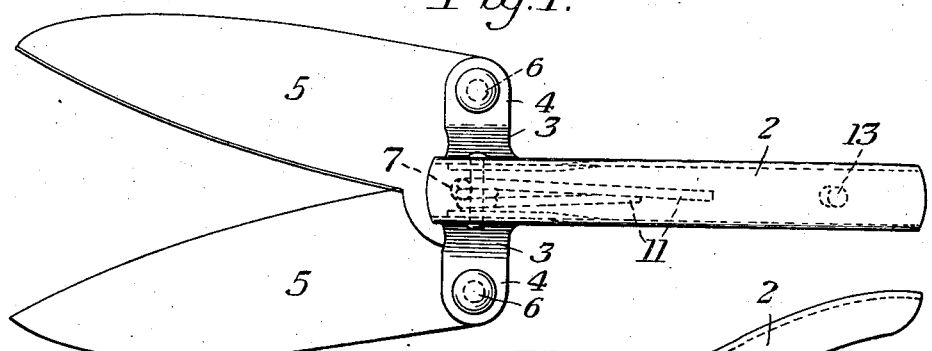
Figure 2:
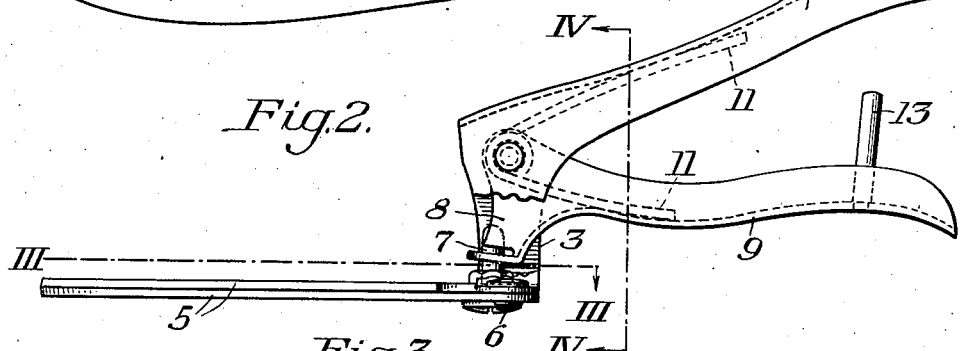
Figure 3:
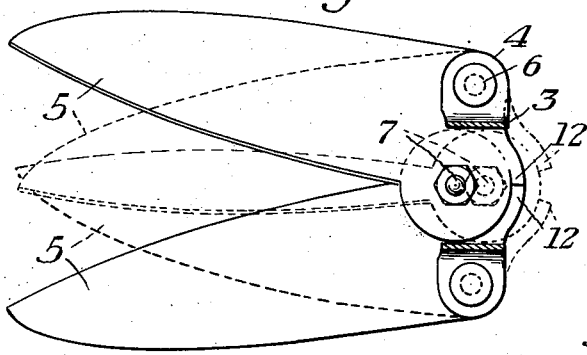
Figure 4:
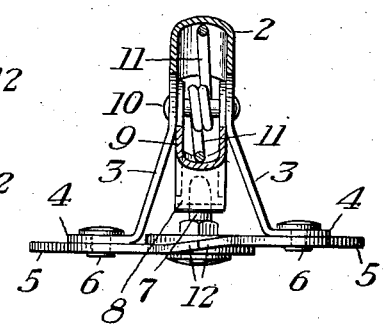

I further provide means on the blades themselves for limiting their movement. In the accompanying drawings, which illustrate two desirable embodiments of my invention, Fig. 1 is a top plan view of a shear in which both blades are movable, Fig. 2 is a side elevation partly broken away of the shear shown in Fig. 1, Figs. 3 and 4 are respectively horizontal and vertical sections taken on the lines III—III and IV—IV of Fig. 2, Fig. 5 is a top plan view of a shear in which only one blade is movable, Fig. 6 is a vertical section taken on the line VI—VI of Fig. 5. Fig. 7 is a horizontal section taken on the line VII—VII of Fig. 6 and Fig. 8 is a section taken on the line VIII—VIII of Fig. 5 and showing the stationary blade in cross section.

In the embodiment of the invention illustrated in Figs. 1 to 4 there is shown a shear comprising a supporting handle 2 having a pair of downwardly extending legs 3 having flared out feet 4 at the bottoms thereof. A pair of cooperating blades 5 is secured to these feet 4, one blade to each foot by pivots 6.

The blades are pivotally secured to one another by an upstanding pin 7 and this pin fits into a hole in the downwardly extending arm 8 of a bell crank operating lever 9. The lever 9 is pivotally mounted in handle 2 on a pin 10 and a spring 11 is provided for normally urging the handle portion of the bell crank lever 9 away from the supporting handle 2. This causes the pin 7 to move forwardly and the blades 5 are thus urged to open position. The movement of the blades in the direction of opening is limited by a pair of stops 12 on the back of the blades as best shown in Fig. 3. A pin 13 is provided on the bell crank lever 9 for limiting the closing movement.

When it is desired to operate the shear, the handle 2 and the operating lever 9 are grasped by the user and are squeezed together. This causes the lever 9 to rotate in a counter clockwise direction as viewed in the drawings, thus forcing the pin 7 to the right as viewed in the drawings. Since the points on the blades 5 at which they are secured to the pivot pin 7 tend to describe arcs of circles around the pivots 6, some freedom in the parts must be provided to prevent binding. This freedom is attained by the fact that the legs 3 are free to spring apart to a limited extent thus permitting smooth operation of shear. When the stroke is completed the blades occupy the dotted line position of Fig. 3.

In the embodiment of the invention illustrated in Figs. 5 to 8, parts corresponding to similar parts in the embodiment of Figs. 1 to 4 have been given the same reference character with a letter "a" suffixed thereto. In this form of the invention a fixed blade 20 and a movable blade 21 are provided. The fixed blade 20 is secured to a downwardly extending leg 3$^b$ of the handle 2$^a$ by rivets 22 extending through the foot 4$^b$. A bead 23 is struck up on the blade 20 so that a stiff yet narrow blade may be employed. A relatively thin fixed blade is of material advantage in trimming around side walks and the like.

The blade 20 is provided with a slot 24 and the pivot pin 7$^a$ extends upwardly through this slot. The pivot pin is secured only to the movable blade 21 and slides freely in the slot 24. The downwardly extending portion 8$^a$ of the operating lever 9$^a$ engages the pin 7$^a$ in the same way as the operating lever of the previously described embodiment of the lever engages the upstanding pivot pin. Stops 12ᵃ are provided for limiting the movement.

In the operation of the second embodiment of the invention, the spring 11ᵃ normally urges the pin 7ᵃ to the left as viewed in the drawings and thus maintains the blades in the open position. When the hand is closed, however, the pin 7ᵃ moves backwardly in slot 24 and the movable blade 21 is closed as indicated in chain lines in Fig. 7. During this movement, the legs 3ᵃ and 3ᵇ spread slightly as is required.

In operation, it is found that the shear works smoothly and does not tire the user. The shear is relatively simple to manufacture and is a sturdy and reliable mechanism.

I have illustrated two forms of my invention, in one of which both blades move and in the other of which only one blade is actuated. Each of the forms has features which appeal to the individual preferences of different users, but in either form, free movement of the pivoted blade is provided by reason of the spring of the supporting handle. It will be understood, however, that the invention is not limited to the illustrated forms as it may be otherwise embodied within the scope of the following claims.

I claim:

1. A shear comprising a pair of blades, a support therefor comprising a pair of legs to which the blades are secured, at least one of the blades being pivotally mounted and means for actuating the movable blade, the legs being free to spring toward and away from one another when the blade is actuated.

2. A shear comprising a pair of blades, a support for the blades having a pair of legs to which the blades are attached, one to each leg, and means for relatively moving the blades, the legs being free to spring toward and away from one another when such relative movement of the blades is effected.

3. A shear comprising a pair of blades, a support lying in a plane substantially perpendicular to the plane of the blades, a pair of downwardly projecting legs on the support, one for supporting each blade, and means for causing relative movement of the blades, the legs being free to spring towards and away from one another when such movement is effected.

4. A shear comprising a pair of relatively movable blades, a supporting handle therefor, said supporting handle lying in a plane substantially perpendicular to the plane of the blades, an operating lever secured to the supporting handle and a connection between the operating lever and at least one of the blades, the blade which is connected to the operating lever being pivotally mounted on the supporting handle, the support permitting movement of the pivot when the blade is actuated.

5. A shear comprising a pair of relatively movable blades, a support for the blades, the blades being attached to the support and the support permitting movement of the point of attachment of a blade when such blade is actuated, a handle for moving the blade in one direction and spring means for moving the blade in the reverse direction.

6. A shear comprising a pair of blades, a support therefor, the blades being secured to the support at spaced apart points, at least one of the blades being pivotally mounted on the support, a handle for moving the pivoted blade in one direction and spring means for moving the pivoted blade in the reverse direction, the support being spring-like and permitting movement of the pivot when the blade is actuated.

In testimony whereof I have hereunto set my hand.

WILLIAM DOOLEY.